United States Patent [19]

Mieda et al.

[11] Patent Number: 5,414,652

[45] Date of Patent: May 9, 1995

[54] MAGNETO-OPTICAL MEMORY ELEMENT

[75] Inventors: Michinobu Mieda, Shiki; Hiroyuki Katayama; Akira Takahashi, both of Nara; Kenji Ohta, Kitakatsuragi, all of Japan

[73] Assignee: Sharp Kabushiki Kaisha, Osaka, Japan

[21] Appl. No.: 293,720

[22] Filed: Aug. 22, 1994

[30] Foreign Application Priority Data

Aug. 27, 1993 [JP] Japan .................................. 5-212953
Aug. 12, 1994 [JP] Japan .................................. 6-190573

[51] Int. Cl.⁶ .............................................. G11C 13/06
[52] U.S. Cl. ..................................... 365/122; 365/215; 369/13; 360/118
[58] Field of Search ................... 365/122, 106, 64, 66, 365/215, 234; 369/13; 360/114

[56] References Cited

U.S. PATENT DOCUMENTS 5,084,860  1/1992  Maeda et al. .................... 369/111 X
5,168,482  12/1992 Aratami et al. ................... 365/122 X
5,278,810  1/1994  Takahashi et al. ............... 365/122 X

FOREIGN PATENT DOCUMENTS 58-23333  2/1983  Japan .
63-57859  11/1988 Japan .

*Primary Examiner*—Do Hyun Yoo
*Attorney, Agent, or Firm*—David G. Conlin; Kevin J. Fournier

[57] ABSTRACT

A magneto-optical memory element including: grooves, formed on at least one surface of a transparent substrate, for guiding a light beam; a magneto-optical recording layer formed on the surface of said transparent substrate on which the grooves are formed, wherein a width of each groove and a width of each land formed between the grooves are substantially equal, information is recorded on and reproduced from tracks on the grooves and the lands, and a groove depth d (track depth) is arranged such that $0.13 \times \lambda/n \leq d \leq 0.18 \times \lambda/n$, where $\lambda$ is a wavelength of the light beam and n is a refraction index of the transparent substrate. Assuming that a diameter of the light beam at a portion where a light intensity of the light beam becomes $1/e^2$ of a light intensity of the center of the light beam is L, a track pitch p is arranged such that $0.6 \leq L/p \leq 1.2$. Therefore, even when the track density is increased, i.e., the width of the groove portion and the width of the land portion are reduced, a satisfactory signal quality with low level of crosstalk is obtained. Accordingly, such a magneto-optical disk achieves a high recording density.

4 Claims, 7 Drawing Sheets

MAGNETO-OPTICAL MEMORY ELEMENT

FIELD OF THE INVENTION

The present invention relates to a magneto-optical memory element for use with a magneto-optical recording apparatus, such as a magneto-optical disk, a magneto-optical tape, and a magneto-optical card.

BACKGROUND OF THE INVENTION

Research on and development of magneto-optical disks as rewritable optical disks are progressing, and some magneto-optical disks have already been practically used as external memories for computers.

The magneto-optical disk uses a perpendicularly magnetized film as a recording medium, and records and reproduces information using light. The magneto-optical disk is characterized by having a large storage capacity compared with a floppy or hard disk including a film which exhibits in-plane magnetization.

In recent years, a memory having a larger capacity is demanded, and research on hard disks and magneto-optical disks is actively carried out to achieve an improved recording density.

Japanese Publication for Examined Patent Application No. 57859/1988 (Tokukosho 63-57859) proposes an optical recording and reproduction apparatus which achieves a high recording density by providing groove portions and land portions of widths arranged to be substantially 1 to 1 on a transparent substrate and by recording and reproducing information on guide tracks formed on the groove and land portions.

However, with the above-mentioned conventional structure, when the track density is increased and when reproducing information from a track on a groove portion (or land portion), the level of crosstalk caused by the tracks on the adjacent land portions (or groove portions) increases. This imposes a limitation in increasing the recording density.

SUMMARY OF THE INVENTION

An object of the present invention is to provide a magneto-optical memory element capable of achieving a signal of satisfactory quality and high-density recording even when the track density is increased, i.e., the width of a groove and of a land are reduced.

In order to achieve the above object, a magneto-optical memory element of the present invention includes: a transparent substrate; grooves, formed on at least one surface of the transparent substrate, for guiding a light beam; lands, each land being formed between the grooves; a magneto-optical recording layer formed on the surface of the transparent substrate on which the grooves are formed; and tracks formed on the grooves and lands, wherein a width of each groove and a width of each land are substantially equal, information is recorded on and reproduced from the tracks on the grooves and the lands, and a groove depth d is arranged such that $$0.13 \times \lambda/n \leq d \leq 0.18 \times \lambda/n$$

where $\lambda$ is a wavelength of the light beam and n is a refraction index of said transparent substrate.

In order to achieve the object, another magneto-optical memory element of the present invention is the above-mentioned magneto-optical memory element, and is arranged such that, assuming that the diameter of the light beam at a portion where a light intensity of the light beam becomes $1/e^2$ of a light intensity of the center of the light beam is L, a track pitch p is arranged such that $$0.6 \leq L/p \leq 1.2$$

With this arrangement, when information is reproduced from a track on a groove (or land), the level of crosstalk caused by tracks on the adjacent lands (or grooves) is significantly reduced compared with the case where the above-mentioned conditions are not satisfied. Therefore, even when the track density is increased, i.e., the width of the groove and the width of the land are made smaller, satisfactory signal quality is obtained. Namely, such a magneto-optical disk achieves high recording density.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
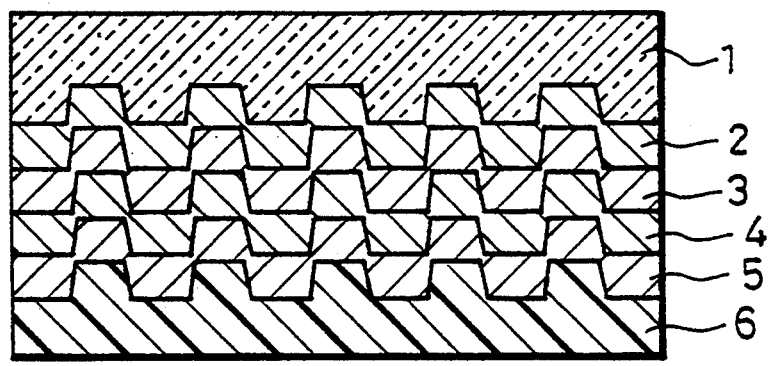
FIG. 1 is a vertical cross section showing a schematic structure of a magneto-optical disk according to one embodiment of the present invention.

As illustrated in FIG. 1, a magneto-optical disk according to one embodiment of the present invention includes a transparent substrate 1, a transparent dielectric layer 2, a magneto-optical recording layer 3, a transparent dielectric layer 4, a reflecting layer 5, and an overcoat layer 6, laminated in this order.

The transparent substrate 1 is a circular glass substrate having a diameter of 130 mm and a thickness of 1.2 mm. One surface of the transparent substrate 1 has guide tracks for guiding a light beam. The guide tracks are formed on groove portions and land portions at a pitch of 1.6 μm. The width of each groove portion and land portion is 0.8 μm.

The transparent dielectric layer 2 is formed by AlN with a thickness of 80 nm on a surface of the transparent substrate 1 whereupon the guide tracks are formed.

DyFeCo as an alloy of rare earth and transition metal is formed with a thickness of 20 nm on the transparent dielectric layer 2 so as to produce the magneto-optical recording layer 3. The composition of DyFeCo is $Dy_{0.23}(Fe_{0.82}Co_{0.18})_{0.77}$ and its Curie temperature about 200° C.

AlN with a thickness of 20 nm is formed as the transparent dielectric layer 4 on the magneto-optical recording layer 3. Al with a thickness of 40 nm is formed as the reflecting layer 5 on the transparent dielectric layer 4. The overcoat layer 6 is formed by an ultraviolet ray-hardening resin of polyurethaneacrylate series with a thickness of 5 μm on the reflecting layer 5.

The guide tracks on a surface of the transparent substrate 1 is directly formed on a glass surface by reactive ion etching.

The transparent dielectric layer 2, the magneto-optical recording layer 3, the transparent dielectric layer 4 and the reflecting layer 5 are formed in a sputtering device using a sputtering method without breaking a vacuum.

AlN of the transparent dielectric layers 2 and 4 is formed by reactive sputtering where an Al target is sputtered in $N_2$ gas atmosphere.

The magneto-optical recording layer 3 is formed by sputtering a so-called composite target which is made by arranging Dy chips on a FeCo alloy target or a ternary alloy target of DyFeCo using Ar gas.

The overcoat layer 6 is formed by applying a resin onto the reflecting layer 5 using a spin coating machine and hardening the resin with the application of ultraviolet rays thereto.

With this structure, information is recorded on and reproduced from tracks on the groove portions and land portions of the magneto-optical recording layer 3.

In order to study the relationship between the depth of the groove portion and the level of crosstalk, grooves having a depth of 50, 60, 70, 80 and 90 nm were respectively formed as samples.

Figure 2A:
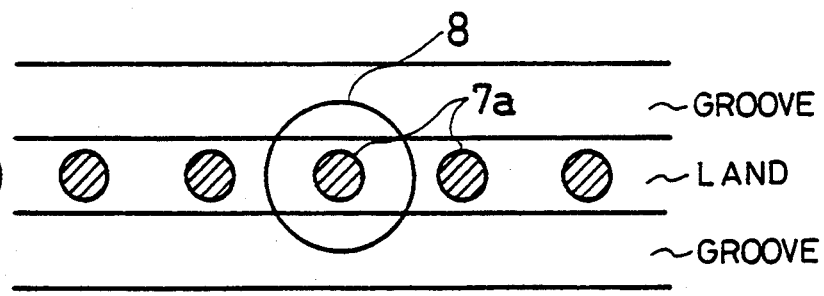
FIGS. 2 (a) and 2(b) are views explaining a method for measuring the level of crosstalk of the magneto-optical disk of FIG. 1.

Signals were recorded only on the magneto-optical recording layer 3 on the land portions of each sample, and recording domains 7a with a bit length of 0.765 μm were formed as shown in FIG. 2(a). The signals recorded on the magneto-optical recording layer 3 on the land portions were reproduced by moving a light beam spot 8 to follow the land portions, and signal levels were measured.

Figure 2B:
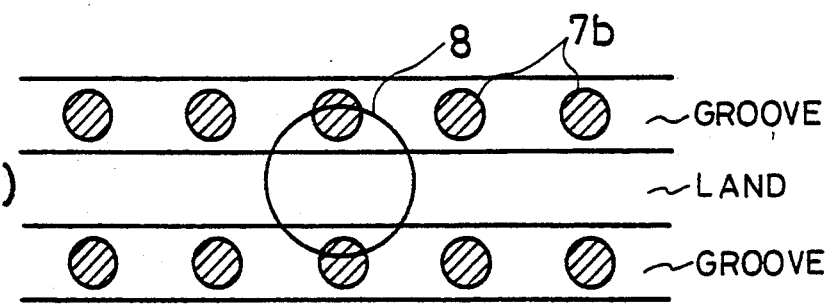

Next, signals were recorded only on the magneto-optical recording layer 3 on the groove portions of each sample, and recording domains 7b with a bit length of 0.765 μm were formed as shown in FIG. 2(b). The signals recorded on the magneto-optical recording layer 3 on the groove portions, i.e., overflow signals were reproduced by moving the light beam spot 8 to follow the land portions, and signal levels were measured.

The difference between the two signal levels was detected as the level of crosstalk. The wavelength of the light beam used for measurement was 780 nm. The numerical aperture of an objective lens for converging the light beam into the light beam spot 8 on the magneto-optical disk and focusing reflected light from the magneto-optical disk was 0.55. The diameter of the light beam, i.e., the diameter of a portion of the light beam spot 8 where the light intensity was $1/e^2$ of the light intensity of the beam center was 1.2 μm.

The results of measurement is shown in Table 1. The results indicate that crosstalk is significantly reduced at a track depth, i.e., depth of the groove portion around 80 nm.

[TABLE 1]

| TRACK PITCH | TRACK DEPTH | CROSSTALK |
|---|---|---|
| 1.6 μm | 50 nm | −16 dB |
|  | 60 nm | −19 dB |
|  | 70 nm | −26 dB |
|  | 80 nm | −36 dB |
|  | 90 nm | −24 dB |

Figure 3:
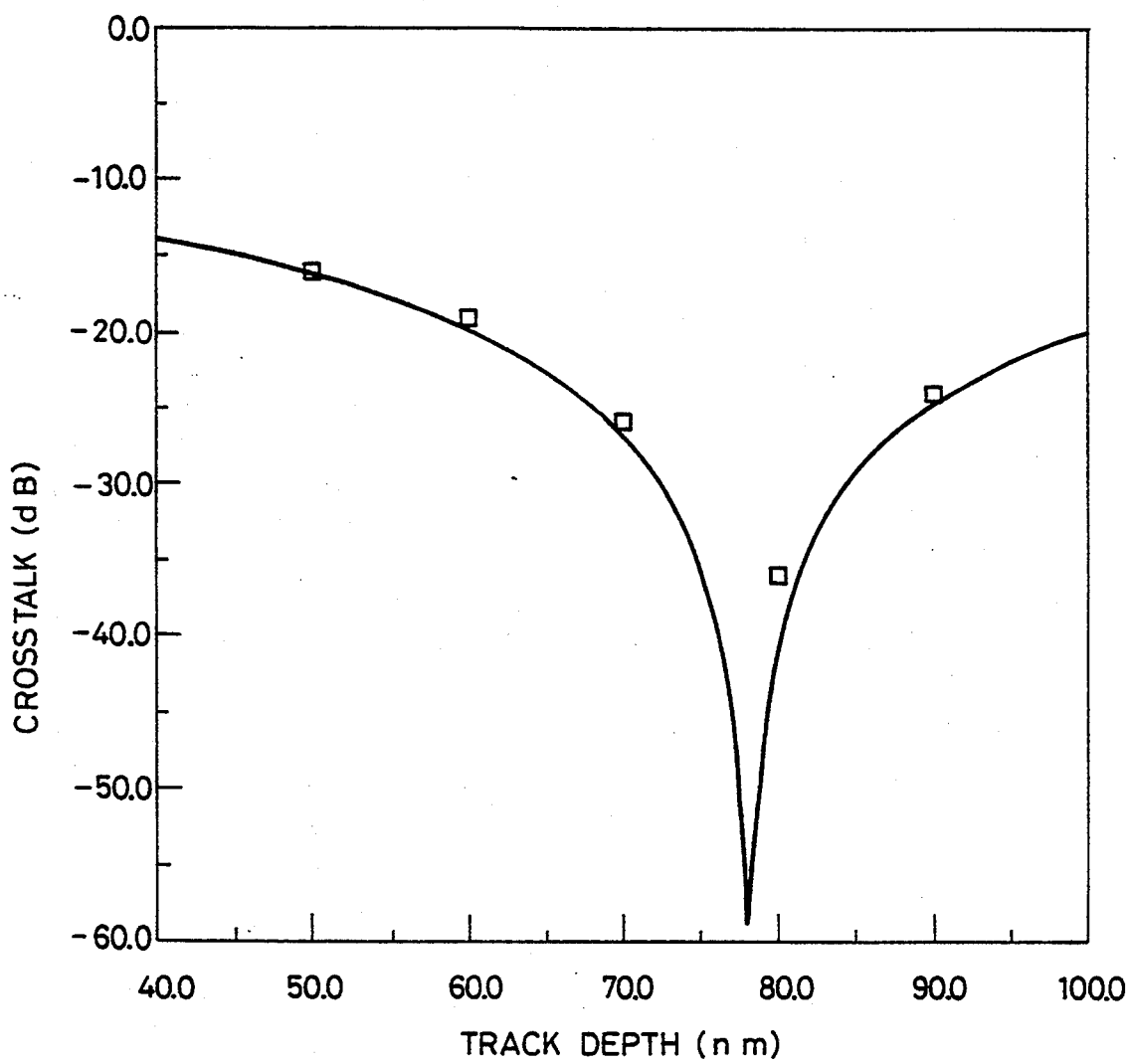
FIG. 3 is a graph showing dependency of crosstalk of the magneto-optical disk of FIG. 1 upon the track depth.

FIG. 3 shows a calculated curve obtained by simulation of the relationship between the track depth and the level of crosstalk. The calculated curve substantially corresponds to the measured values marked by o. According to the curve, the crosstalk becomes minimum at a track depth around 78 nm ($0.15 \times \lambda/n$, where λ is the wavelength of the light beam and n is a refraction index of the transparent substrate 1). The level of crosstalk does not exceed −23 dB when the track depth is in a range from 66 to 92 nm. Namely, if the depth of the guide track is $k \times \lambda/n$, when $0.13 \leq k \leq 0.18$, crosstalk caused by adjacent tracks is reduced, and satisfactory reproduced signal quality is obtained, thereby enabling high density recording.

Table 2 shows relationship between the track depths in the above-mentioned range and the level of crosstalk when the ratio L/p (L is the light beam diameter and p is the track pitch) is varied. According to Table 2, when L/p is not larger than 1.2, the level of crosstalk becomes equal to or lower than −23 dB. If L/p becomes smaller than 0.6, the level of crosstalk does not exceed −30 dB even when the track depth is outside the above-mentioned range, and therefore the effect of the present invention is lowered. Thus, when the light beam diameter L and the track pitch p satisfied the condition, $0.6 \leq L/p \leq 1.2$, the level of crosstalk was reduced in a manner described above. Table 1 shows the results when L/p=0.75 (=1.2 μm/1.6 μm).

As described above, if L/p becomes smaller than 0.6, the level of crosstalk does not exceed −30 dB even when the track depth is outside the above-mentioned range. In this case, it is necessary to decrease the light beam diameter L or to increase the track pitch p. However, reducing the light beam diameter is technically difficult, and high density recording is not achieved if the track pitch p is increased.

[TABLE 2]

| L/p | k | | | | | |
|---|---|---|---|---|---|---|
|  | 0.13 | 0.14 | 0.15 | 0.16 | 0.17 | 0.18 |
| 1.50 | −4 dB | −5 dB | −7 dB | −8 dB | −10 dB | −11 dB |
| 1.33 | −8 dB | −9 dB | −10 dB | −12 dB | −15 dB | −18 dB |
| 1.20 | −7 dB | −9 dB | −12 dB | −15 dB | −19 dB | −28 dB |
| 1.00 | −10 dB | −13 dB | −16 dB | −21 dB | −31 dB | −31 dB |

[TABLE 2]-continued

| L/p | k 0.13 | 0.14 | 0.15 | 0.16 | 0.17 | 0.18 |
| --- | --- | --- | --- | --- | --- | --- |
| 0.86 | −19 dB | −24 dB | −35 dB | −32 dB | −24 dB | −20 dB |
| 0.75 | −25 dB | −31 dB | −50 dB | −32 dB | −26 dB | −23 dB |
| 0.67 | −37 dB | −39 dB | −29 dB | −25 dB | −22 dB | −20 dB |
| 0.60 | −50 dB | −37 dB | −31 dB | −28 dB | −25 dB | −23 dB |
| 0.55 | −50 dB | −50 dB | −50 dB | −49 dB | −45 dB | −43 dB |

In this embodiment, DyFeCo was used as a material for the magneto-optical recording layer 3. However, it is not necessary to limit the material to DyFeCo. Namely, it is possible to use materials which are used for developing conventional magneto-optical disks, i.e., materials having perpendicular magnetization from room temperature to the Curie temperature which is in a temperature range suitable for recording, i.e., between 150° and 250° C. In addition to DyFeCo used in this embodiment, for example, TbFeCo, GdTbFe, NdDyFeCo, GdDyFeCo, and GdTbFeCo are desirable materials.

As for materials for the transparent dielectric layers 2 and 4, other than AlN, for example, the following are suitable materials: SiN, AlSiN, AlTaN, SiAlON, TiN, TiON, BN, ZnS, $TiO_2$, $BaTiO_3$, and $SrTiO_3$.

Regarding the transparent substrate 1, not only a glass substrate, but also a substrate formed by chemically tempered glass is a suitable material. Alternatively, a so-called 2P-layered glass substrate which is produced by forming an ultraviolet rays-hardening resin film on the glass substrate, a substrate formed by polycarbonate (PC), polymethyl methacrylate (PMMA), amorphous polyolefin (APO), polystyrene (PS), polybiphenyl chloride (PVC), or epoxy may be used for the transparent substrate 1.

When chemically tempered glass is used as a material for the transparent substrate 1, the following advantages are obtained. Excellent mechanical properties (vibration, eccentricity, warp, tilt, etc.) are achieved. It is unlikely to be scratched by sand or dust as the hardness of the transparent substrate 1 is high. It is unlikely to be dissolved into various kinds of solvent as it is chemically stable. Sand or dust is unlikely to adhere to the substrate because it is harder to be charged compared with the plastic substrate. It is hardly to be cracked because it is chemically reinforced. A reliable performance of the magneto-optical recording medium is ensured for a long time because the moisture resistance, oxidization resistance and thermal resistance are improved. A high quality signal is obtained as it has excellent optical property.

When PC is used as a material for the transparent substrate 1, an injection molding is feasible. This allows the mass-production of the same transparent substrate 1 and a reduction in the manufacturing cost. Since the transparent substrate 1 made of PC has lower water absorption compared with other plastics, a reliable performance of the magneto-optical disk is ensured for a longer time, and excellent heat resistance and impact resistance are achieved.

Additionally, if materials including PC which permit injection molding are used for the transparent substrate 1, a guide track, a preformed pit, etc., can be formed simultaneously on the surface of the transparent substrate 1 by installing the stamper on a metal mold in injection molding.

In this embodiment, the reflecting layer 5 was included. However, it is possible to remove the reflecting layer 5 from the structure. Although an ordinary single layer film having perpendicular magnetization was described as the magneto-optical recording layer 3 in this embodiment, a multi-layer film enabling overwriting using light-intensity modulation or super resolution may also be used.

Referring now to FIGS. 4 to 11, the following description discusses another embodiment of the present invention. The members having the same function as in the above-mentioned embodiment will be designated by the same code and their description will be omitted.

Figure 4:
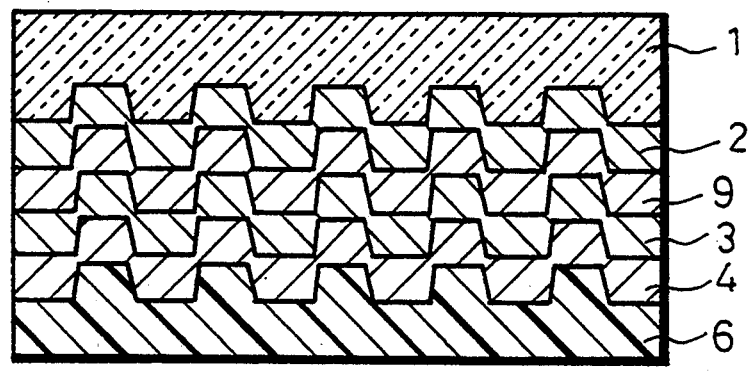
FIG. 4 is a vertical cross section showing a schematic structure of a magneto-optical disk according to another embodiment of the present invention.

As illustrated in FIG. 4, a magneto-optical disk according to this embodiment includes a transparent substrate 1, a transparent dielectric layer 2, a readout layer 9, a magneto-optical recording layer 3, a transparent dielectric layer 4, and an overcoat layer 6, laminated in this order.

The transparent substrate 1 is a circular glass substrate having a diameter of 130 mm and a thickness of 1.2 mm. There are guide tracks for guiding a light beam on a surface of the transparent substrate 1. The guide tracks are formed on groove portions and land portions at a pitch of 1.6 μm. The width of each groove portion and land portion is 0.8 μm.

The transparent dielectric layer 2 is formed by AlN with a thickness of 80 nm on a surface of the transparent substrate 1 having thereon the guide tracks.

GdFeCo as an alloy of rare earth and transition metal is formed to have a thickness of 50 nm on the transparent dielectric layer 2 to produce the readout layer 9. The composition of GdFeCo is $Gd_{0.26}(Fe_{0.82}Co_{0.18})_{0.74}$ and its Curie temperature is about 300° C.

The readout layer 9 shows substantially in-plane magnetization at room temperature, and transition to perpendicular magnetization at temperatures ranging from 100° to 125° C.

DyFeCo as an alloy of rare earth and transition metal is formed to have a thickness of 50 nm on the readout layer 9 to produce the magneto-optical recording layer 3. The composition of DyFeCo is $Dy_{0.23}(Fe_{0.82}Co_{0.18})_{0.77}$ and its Curie temperature is about 200° C.

AlN with a thickness of 20 nm is formed as the transparent dielectric layer 4 on the magneto-optical recording layer 3. An ultraviolet ray-hardening resin of polyurethaneacrylate series with a thickness of 5 μm is formed on the transparent dielectric layer 4 to produce the overcoat layer 6.

The transparent substrate 1, the transparent dielectric layer 2, the magneto-optical recording layer 3, the transparent dielectric layer 4, and the overcoat layer 6 are formed by the materials and method described in Embodiment 1.

The readout layer 9 is formed by sputtering a so-called composite target which is made by arranging Gd chips on a FeCo alloy target or a ternary alloy target of GdFeCo using Ar gas.

Figure 5:
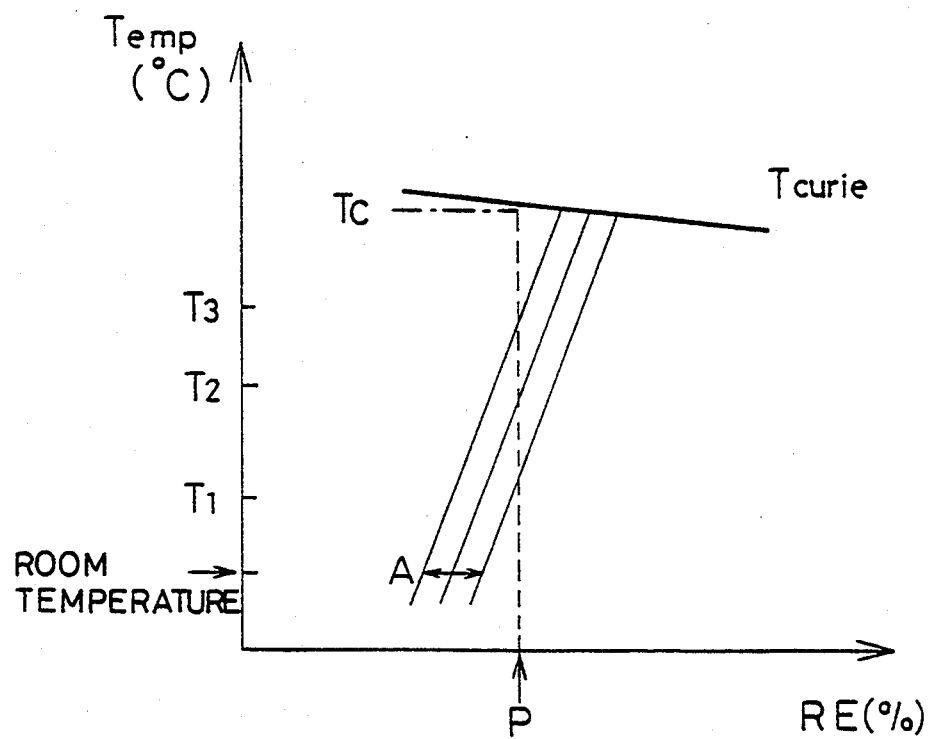
FIG. 5 is a view showing a magnetic state of a material used for a readout layer of the magneto-optical disk of FIG. 4.

FIG. 5 shows a magnetic state of an alloy of rare earth and transition metal which is used as a material for the readout layer 9. In FIG. 5, the horizontal axis indicates a rare earth metal (RE) content, while the vertical axis indicates temperature. As shown in this figure, the composition range in which perpendicular magnetization (indicated by A) is observed is extremely small. This is because that perpendicular magnetization is observed only in the vicinity of the compensation composition (indicated by P) with which the magnetic moment of the rare earth metal balances that of the transition metal.

Since magnetic moments of the rare earth metal and the transition metal have different temperature characteristics, the magnetic moment of the transition metal becomes larger than that of the rare earth metal at high temperatures. Therefore, the content of the rare earth metal is increased compared with that in the compensation composition for room temperature so that in-plane magnetization is observed at room temperature. When the light beam is irradiated, the temperature of the irradiated portion rises. As a result, the magnetic moment of the transition metal becomes relatively large and balances the magnetic moment of the rare earth metal, thereby showing perpendicular magnetization.

Figure 6:
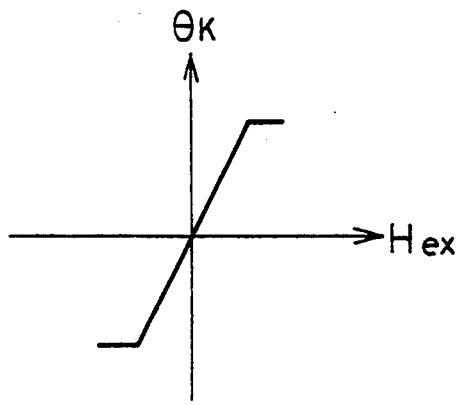
FIG. 6 is a graph showing hysteresis characteristics of the composition P in the magnetic state shown in FIG. 5 from room temperature to temperature $T_1$.
Figure 7:
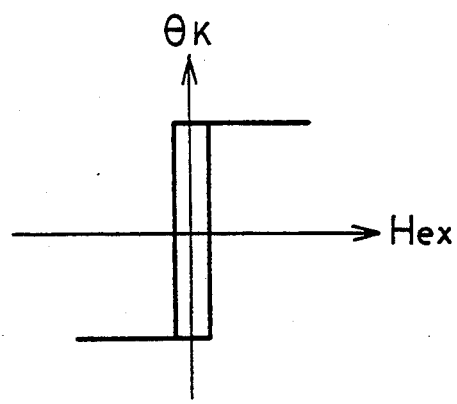
FIG. 7 is a graph showing hysteresis characteristics of the composition P in the magnetic state shown in FIG. 5 from temperature $T_1$ to temperature $T_2$.
Figure 8:
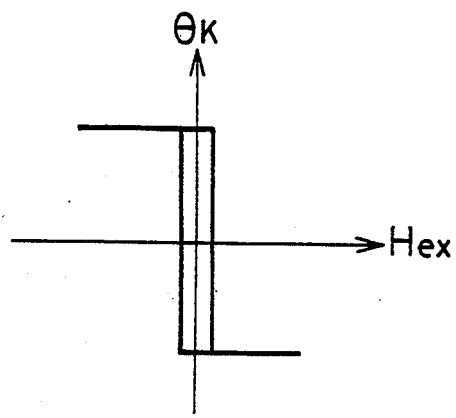
FIG. 8 is a graph showing hysteresis characteristics of the composition P in the magnetic state shown in FIG. 5 from temperature $T_2$ to temperature $T_3$.
Figure 9:
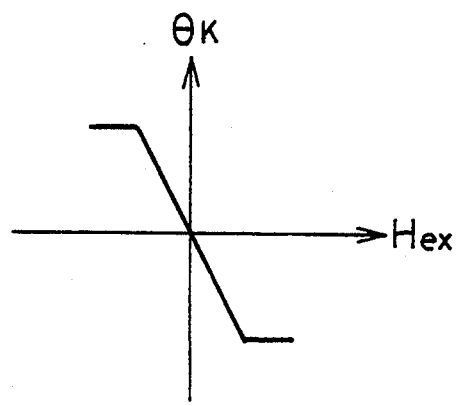
FIG. 9 is a graph showing hysteresis characteristics of the composition P in the magnetic state shown in FIG. 5 from temperature $T_3$ to Curie temperature Tc.

FIGS. 6 to 9 show an example of hysteresis characteristics of the readout layer 9. In each figure, the horizontal axis indicates an external magnetic field (Hex) which is perpendicularly applied to a film surface of the readout layer 9, and the vertical axis indicates a polar Kerr rotation angle ($\theta k$) when light is applied to the film surface from the perpendicular direction. FIG. 6 shows hysteresis characteristics of composition P in the magnetic state shown in FIG. 5 from room temperature to temperature $T_1$. FIGS. 7 to 9 show hysteresis characteristics of composition P at temperatures between $T_1$ and $T_2$, $T_2$ and $T_3$, and between $T_3$ and Curie temperature Tc, respectively.

In the temperature range between $T_1$ and $T_3$, the hysteresis characteristics where the polar Kerr rotation angle abruptly changes with respect to the external magnetic field is observed. However, in the temperature ranges other than above, the polar Kerr rotation angle does not have hysteresis characteristics.

Inclusion of the readout layer 9 enables a higher recording density. The reason for this is discussed below.

The recording density of a magneto-optical recording medium depends on the size of a recording and reproduction-use light beam on the magneto-optical recording medium. With the use of the readout layer 9, it becomes possible to reproduce a recording bit smaller than the size of the light beam.

Figure 10:
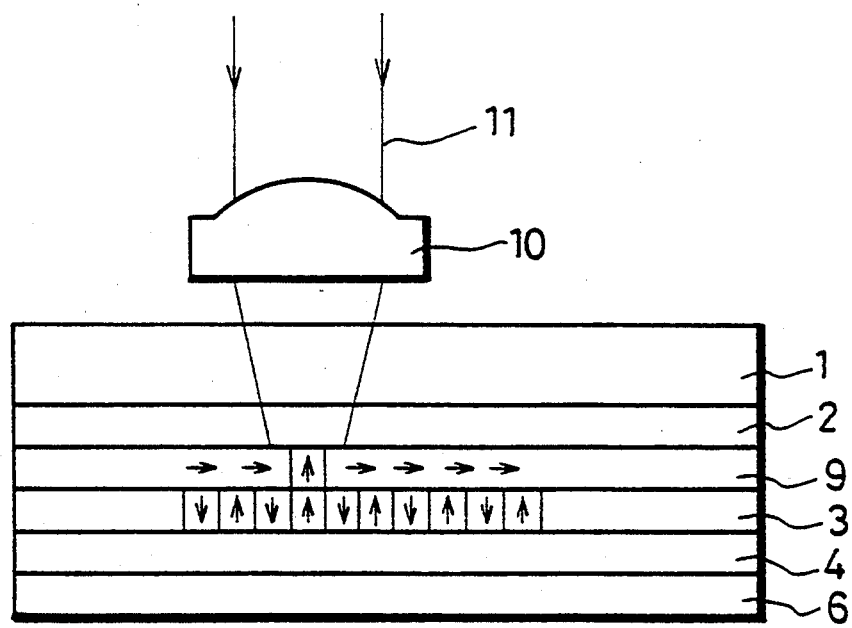
FIG. 10 is a view explaining a method for reproducing the magneto-optical disk of FIG. 4.

In the reproduction process, as illustrated in FIG. 10, a reproduction-use light beam 11 is irradiated on the readout layer 9 through the converging lens 10 and the transparent substrate 1. Here, an assumption is made that information corresponding to the magnetization directions shown by the arrows of FIG. 10 has already been recorded.

The portion of the readout layer 9 exposed to the reproduction-use light beam 11 shows the highest temperature rise around the center thereof, and therefore the temperature of the central portion becomes higher than the peripheral portion. This is because that since the reproduction-use light beam 11 is converged to the diffraction limit by the converging lens 10, the light intensity distribution becomes Gaussian distribution, and the temperature distribution in the reproduced portion on the magneto-optical disk becomes substantially Gaussian distribution. Then, if the light beam 11 of an intensity which causes the temperatures of portions around the center to reach or exceed $T_1$ shown in FIG. 5, the temperature of the peripheral portion becomes equal to or lower than $T_1$. Since the information is reproduced only from portions having temperatures equal to or higher than $T_1$, a recording bit which is smaller than the diameter of the light beam 11 is reproduced, thereby resulting in a significantly increased recording density.

More specifically, the magnetization in an area having a temperature equal to or higher than $T_1$ changes from in-plane magnetization to perpendicular magnetization (from FIG. 6 to FIG. 7 or 8). At this time, the magnetization direction of the magneto-optical recording layer 3 is copied onto the readout layer 9 by an exchange coupling force between the readout layer 9 and the magneto-optical recording layer 3. On the other hand, since the temperatures of portions peripheral to the portion corresponding to the center of the reproduction-use light beam 11 are not higher than $T_1$, in-plane magnetization is maintained as shown in FIG. 6. Consequently, the polar Kerr effect is not produced for the light beam 11 applied to the film surface from the perpendicular direction.

As described above, when a portion having a temperature rise shows a change from in-plane magnetization to perpendicular magnetization, only the portion corresponding to the central portion of the reproduction-use light beam 11 produces the polar Kerr effect. Then, information recorded on the magneto-optical recording layer 3 is reproduced by the reflected light from the above-mentioned portion.

When the reproduction-use light beam 11 is moved (i.e., with the rotation of the magneto-optical disk) to reproduce the next recording bit, the temperature of the previously reproduced portion becomes equal to or lower than $T_1$, thereby showing a transition from perpendicular magnetization to in-plane magnetization. The portion whose temperature has fallen does not produces the polar Kerr effect. Consequently, information is not reproduced from the portion whose temperature has fallen, and noise caused by signals from adjacent bits is prevented.

As described above, it is possible to reproduce recorded signals smaller than the diameter of the light beam 11 with the use of the readout layer 9. Moreover, since adjacent recorded signals do not affect the reproduction operation, the recording density is increased.

With this structure, information is recorded on and reproduced from tracks of the magneto-optical recording layer 3 on the groove portions and land portions.

In order to study the relationship between the depth of the groove portion and the level of crosstalk, grooves having a depth of 50, 60, 70, 80 and 90 nm were respectively formed as samples. Moreover, in order to study the relationship between the track pitch and the level of crosstalk, samples having track pitches of 1.2, 1.3 and 1.4 $\mu$m were produced.

The level of crosstalk was measured using these samples in the manner described in Embodiment 1.

The results of measurement is shown in Table 3. Like the above-mentioned embodiment, the results indicate that crosstalk is significantly reduced when the track depth, i.e., the depth of the groove portion is around 80 nm.

[TABLE 3]

| TRACK PITCH | TRACK DEPTH | CROSSTALK |
|---|---|---|
| 1.6 μm | 50 nm | −32 dB |
|  | 60 nm | −36 dB |
|  | 70 nm | −43 dB |
|  | 80 nm | −44 dB |
|  | 90 nm | −38 dB |
| 1.4 μm | 80 nm | −42 dB |
| 1.3 μm |  | −34 dB |
| 1.2 μm |  | −24 dB |

Figure 11:
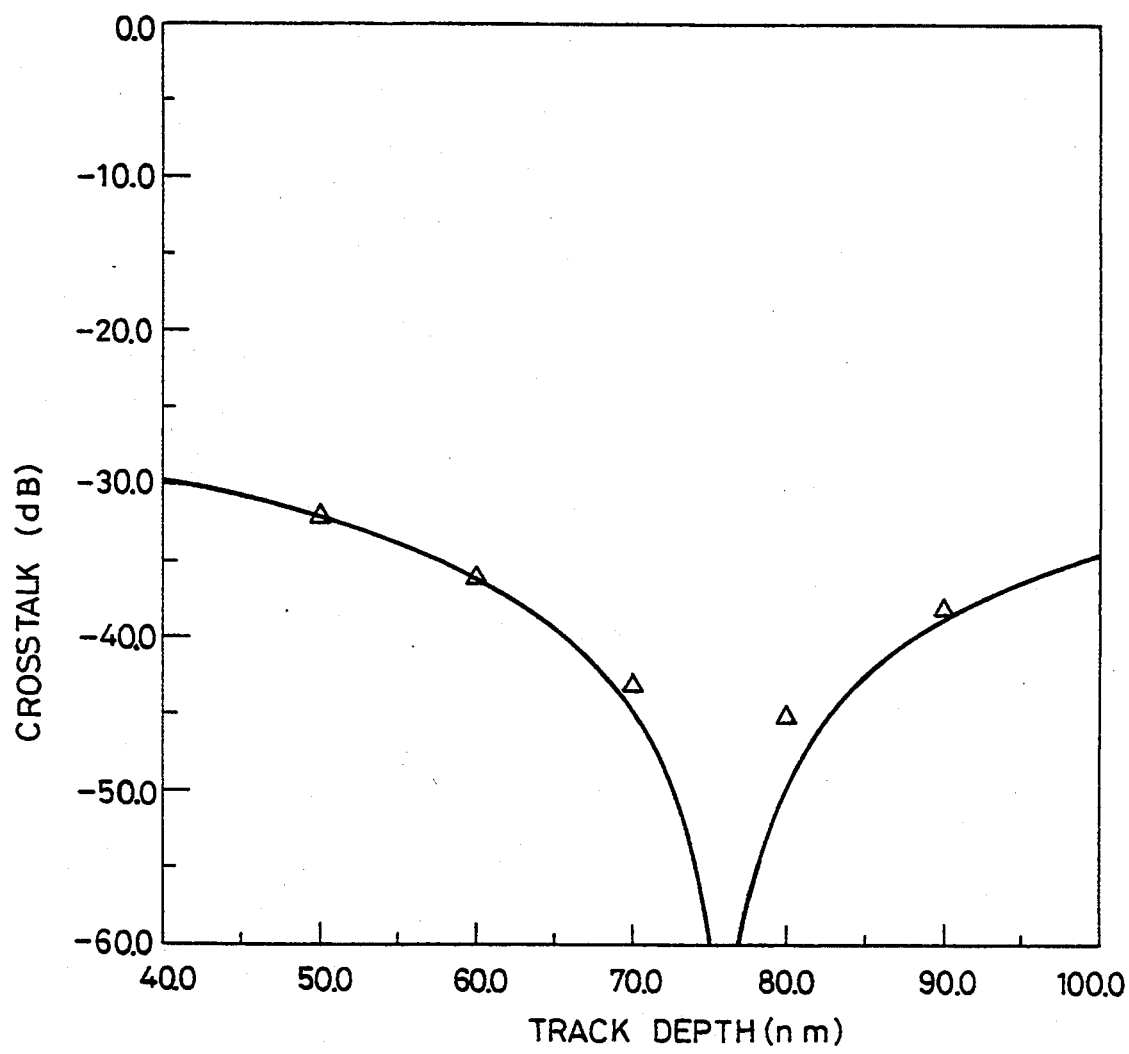
FIG. 11 is a graph showing dependency of the crosstalk of the magneto-optical disk of FIG. 4 upon the track depth.

FIG. 11 shows a calculated curve representing the relationship between the track depth and the level of crosstalk obtained by a simulation similar to that of Embodiment 1. The calculated curve substantially corresponds to the measured values marked by △. According to the curve, the crosstalk becomes minimum when the track depth is around 76 nm, and the value is smaller than that of Embodiment 1.

Table 4 shows the level of crosstalk when the ratio of the light beam diameter L to the track pitch p is varied. According to Table 4, the level of crosstalk does not exceed −23 dB when the ratio L/p is equal to or lower than 1.33. If the ratio L/p becomes smaller than 0.86, the level of crosstalk becomes equal to or lower than −30 dB even when the track depth is outside the above-mentioned range, and the effect of the present invention is reduced. If the ratio L/p is $0.86 \leq L/p \leq 1.33$, the level of crosstalk is reduced as mentioned above. It is thus possible to make the track pitch smaller than that of Embodiment 1.

As described above, if the ratio L/p becomes smaller than 0.86, the level of crosstalk becomes equal to or lower than −30 dB even when the track depth is outside the above-mentioned range. In this case, it is necessary to decrease the light beam diameter L or to increase the track pitch p. However, the reduction of the light beam diameter L is technically difficult, and high density recording is prevented if the track pitch p is increased.

According to Table 3, with the sample having a track depth of 80 nm, even when the track pitch is 1.2 μm, the level of crosstalk is equal to or smaller than −23 dB. It is therefore possible to achieve high-density recording.

[TABLE 4]

| L/p | k |  |  |  |  |  |
|---|---|---|---|---|---|---|
|  | 0.13 | 0.14 | 0.15 | 0.16 | 0.17 | 0.18 |
| 1.50 | −5 dB | −7 dB | −8 dB | −10 dB | −11 dB | −14 dB |
| 1.33 | −9 dB | −10 dB | −12 dB | −15 dB | −18 dB | −23 dB |
| 1.20 | −11 dB | −13 dB | −16 dB | −20 dB | −27 dB | −45 dB |
| 1.00 | −17 dB | −19 dB | −24 dB | −31 dB | −40 dB | −27 dB |
| 0.86 | −29 dB | −36 dB | −50 dB | −35 dB | −29 dB | −26 dB |
| 0.75 | −44 dB | −50 dB | −50 dB | −46 dB | −42 dB | −39 dB |

In this embodiment, the composition of GdFeCo of the readout layer 9 is not limited to the above-mentioned $Gd_{0.26}(Fe_{0.82}Co_{0.18})_{0.74}$. The readout layer 9 needs to have substantially in-plane magnetization at room temperature, and shows a transition from in-plane magnetization to perpendicular magnetization at temperatures higher than room temperature. In addition to GdFeCo used in this embodiment, for example, GdCo, GdFe, TbFeCo, DyFeCo, and HoFeCo are suitable materials.

In this embodiment, the readout layer 9 and the magneto-optical recording layer 3 are sandwiched between the transparent dielectric layers 2 and 4. However, it is possible to include the reflecting layer 5 between the transparent dielectric layer 4 and the overcoat layer 6 or replace the transparent dielectric layer 4 with a radiating layer (not shown). A single layer film for use in a magneto-optical recording medium was employed as the magneto-optical recording layer 3 in this embodiment. However, it is also possible to use a film having a multi-layer structure to enable overwriting using light-intensity modulation.

In the above-mentioned embodiments, a magneto-optical disk was explained. However, the present invention is applicable not only to the magneto-optical disk, but also to magneto-optical memory elements such as a magneto-optical tape and a magneto-optical card.

The magneto-optical disk according to the present invention includes: groove portions, formed at least on one surface of the transparent substrate 1, for guiding the light beam 11; the magneto-optical recording layer 3 on the surface of the transparent substrate 1 having the groove portions thereon; and land portions formed between the groove portions. The width of each groove portion and that of each land portion are substantially equal. Information is recorded on and reproduced from tracks on the groove portions and tracks on the land portions. The depth d (track depth) of the groove portions is set to satisfy $$0.13 \times \lambda/n \leq d \leq 0.18 \times \lambda/n$$

where λ is the wavelength of the light beam 11 and n is the refraction index of the transparent substrate 1.

Assuming that diameter of the light beam at a portion where the light intensity of the light beam becomes $1/e^2$ of the beam center is L, the track pitch p is arranged to satisfy $$0.6 \leq L/p \leq 1.2$$

With this arrangement, when information is reproduced from a track on a groove portion (or land portion), the level of crosstalk by tracks on adjacent land portions (or groove portions) is significantly reduced compared with the case where the track depth and pitch do not satisfy the above-mentioned conditions. Therefore, even when the track density is increased, i.e., the width of the groove portion and of the land portion are made smaller, satisfactory signal quality is obtained. Namely, such a magneto-optical disk achieves high-density recording.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical memory element comprising:

a transparent substrate;

grooves, formed on at least one surface of said transparent substrate, for guiding a light beam;

lands, each land being formed between said grooves;

a magneto-optical recording layer formed on a surface of said transparent substrate on which said grooves are formed; and tracks formed on said grooves and lands, for recording and reproducing information, wherein a width of each groove and a width of each land are substantially equal, information is recorded on and reproduced from said tracks on said grooves and said lands, and a groove depth d is arranged such that $$0.13 \times \lambda/n \leq d \leq 0.18 \times \lambda/n$$

where $\lambda$ is a wavelength of the light beam and n is a refraction index of said transparent substrate.

2. The magneto-optical memory element according to claim 1,
wherein assuming that a diameter of the light beam at a portion where a light intensity of the light beam becomes $1/e^2$ of a light intensity of a center of the light beam is L, a track pitch p is arranged such that $$0.6 \leq L/p \leq 1.2.$$

3. The magneto-optical memory element according to claim 1, further comprising a readout layer which is formed between said transparent substrate and said magneto-optical recording layer, and which shows in-plane magnetization at room temperature and a transition from in-plane magnetization to perpendicular magnetization with a temperature rise.

4. The magneto-optical memory element according to claim 3,
wherein assuming that a diameter of the light beam at a portion where a light intensity of the light beam becomes $1/e^2$ of a light intensity of a center of the light beam is L, a track pitch p is arranged such that $$0.86 \leq L/p \leq 1.33.$$

* * * * *